United States Patent [19]
Gentry et al.

[11] Patent Number: 5,903,270
[45] Date of Patent: May 11, 1999

[54] METHOD AND APPARATUS FOR MAPPING A TWO-DIMENSIONAL TEXTURE ONTO A THREE-DIMENSIONAL SURFACE

[75] Inventors: Steven Gentry, Canoga Park; Jeffrey Pitts, Tarzana; Joyce Freedman, Los Angeles; Maurizio Vecchione, Encino, all of Calif.

[73] Assignee: Modacad, Inc., Culver City, Calif.

[21] Appl. No.: 08/842,622

[22] Filed: Apr. 15, 1997

[51] Int. Cl.[6] .................................................. G06T 1/00
[52] U.S. Cl. ........................ 345/419; 345/429; 345/430
[58] Field of Search .................................. 345/430, 419, 345/420, 421, 422, 429

[56] References Cited

U.S. PATENT DOCUMENTS

| | | | |
|---|---|---|---|
| 5,255,352 | 10/1993 | Falk | 345/125 |
| 5,333,245 | 7/1994 | Vecchione | 345/130 |
| 5,345,541 | 9/1994 | Kelley et al. | |
| 5,369,736 | 11/1994 | Kato et al. | |
| 5,402,533 | 3/1995 | Kelley et al. | |
| 5,432,895 | 7/1995 | Myers | |
| 5,448,687 | 9/1995 | Hoogerhyde et al. | |
| 5,469,535 | 11/1995 | Jarvis et al. | |
| 5,490,239 | 2/1996 | Myers | |
| 5,490,240 | 2/1996 | Foran et al. | |
| 5,495,563 | 2/1996 | Winser | |
| 5,511,153 | 4/1996 | Azarbayejani et al. | |
| 5,751,293 | 5/1998 | Hashimoto et al. | 345/430 |

*Primary Examiner*—Phu K. Nguyen
*Assistant Examiner*—Cliff N. Vo
*Attorney, Agent, or Firm*—Blakely, Sokoloff, Taylor & Zafman LLP

[57] ABSTRACT

A method of mapping two-dimensional textures onto a three-dimensional object yields the correct result in terms of pattern placement, scale, repeat and flow of various textures. This is accomplished by providing a unique user interface to control the texture mapping process. The user controls how the texture should flow and where the texture should be "cut and seamed" to fit the geometry of the three-dimensional object by clicking and dragging directly on the rendered surface of the object. The user is presented with two simultaneous windows: one providing a view of the three-dimensional object being wrapped with texture and the other providing a view of the two-dimensional texture with object surface polygons projected thereon. The texture mapping process is controlled from both windows. The three-dimensional object window gives the user control of the texture flow on the surface of the object. The two-dimensional texture window gives the user control of the orientation of the texture and permits the introduction of mapping distortion to simulate stretching of the texture, if desired.

19 Claims, 3 Drawing Sheets

METHOD AND APPARATUS FOR MAPPING A TWO-DIMENSIONAL TEXTURE ONTO A THREE-DIMENSIONAL SURFACE

RELATED APPLICATION

This application claims priority of co-pending provisional application Serial No. 60/018,214 filed May 23, 1996.

BACKGROUND OF THE INVENTION

1. Field of the Invention

This invention relates generally to the field of computer-aided design (CAD) systems, and particularly to a system for rendering three dimensional objects with surface textures applied thereto.

2. Prior Art

The runaway increase in computer performance/price ratio in recent years has made sophisticated CAD systems available to nearly anyone. Such systems have evolved beyond those intended for use by professional designers and engineers to include a wide variety of consumer applications. For example, CAD systems have been developed for providing point-of-sale demonstrations of product features and options. One application for such a system allows prospective purchasers of furniture to view an item in any of the available finishes or fabrics prior to making a purchase decision.

Texture mapping is a well-known feature of computer graphics systems. In a typical system, a three-dimensional object to be rendered is modeled with a wire frame defining a large number of polygonal surface areas. A mapping function is then determined between a two-dimensional (u,v) texture space and the three-dimensional (x,y,z) object space. Conventional texture mapping processes utilize various projection methods, such as cubic, cylindrical or spherical. One of the primary objectives of these methods is to cover the object surface or parts thereof with seamless texture. Each of these conventional methods introduces some degree of texture distortion as a necessary cost of seamless texture mapping. This is acceptable in most applications where relatively uniform surface textures are desired.

In many other applications, the distortions inherent in prior art projection methods are not acceptable due to the appearance of elasticity in the surface. If the texture mapping is intended to depict a relatively inelastic surface covering on an object, such as fabric on upholstered furniture, seamless mapping is not required. Indeed, seams are a desirable artifact contributing to a more realistic appearance.

SUMMARY OF THE INVENTION

The present invention provides a method for mapping two-dimensional textures onto a three-dimensional object surface which is accurate in terms of pattern placement, scale, repeat and flow of various textures. This is accomplished by providing a unique user interface to control the texture mapping process.

Unlike conventional projection methods, the present invention utilizes a projection method where a faceted three-dimensional object is, in a sense, "flattened" by breaking the object along polygon edges. This creates an undistorted projection of the texture onto the surface of the object, albeit at a cost of seamless mapping. This cost is entirely acceptable and even desirable in many applications, such as correctly rendering upholstered furniture.

The method of the present invention can be alternatively viewed as "wrapping" a two-dimensional texture onto the three-dimensional surface. Instead of breaking the three-dimensional surface along polygon edges to permit a direct mapping from a two-dimensional space to three-dimensional space, thereby losing the three-dimensional character of the object, the object is wrapped in texture while remaining in three-dimensional space. The user controls how the texture should flow and where the texture should be cut and seamed to fit the geometry of the object. These operations are performed in a three-dimensional viewing window which allows the operator to manipulate a cursor directly on the three-dimensional surface.

The foregoing objectives are accomplished with a method comprising the steps of displaying a graphic representation of the three-dimensional object in a first display window; displaying a surface detail pattern or other surface texture in a second display window; designating a first polygonal surface on the three-dimensional object; applying the surface detail pattern to the first polygonal surface; designating a second polygonal surface having a common boundary with the first polygonal surface; and applying the surface detail pattern to the second polygonal surface such that there is pattern continuity across the common boundary.

The invention also comprises a method for adding fine-scale surface detail to a three-dimensional object. This is achieved by directly "painting" details onto the three-dimensional surface to approximate local surface lighting effects that would naturally be caused by bumps, fold, waves and other disturbances on the textured surface.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
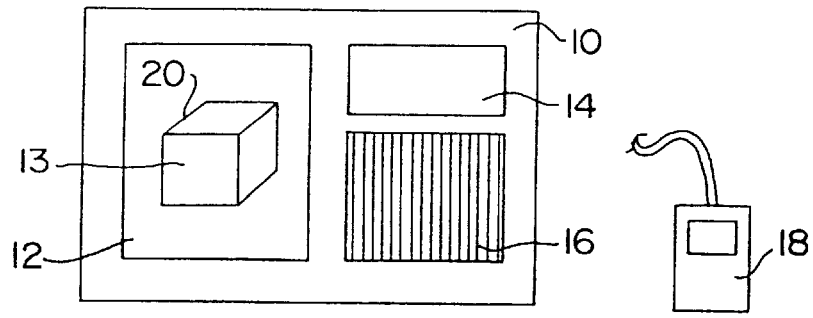
FIG. 1 illustrates the graphic user interface employed with the present invention.

FIG. 1 illustrates the operating environment of the present invention. The operator's computer display screen 10 is partitioned into a plurality of windows. An object window 12 displays a three-dimensional object 20 to which a surface texture is to be applied. A cursor 13 is provided under control of a mouse or other pointing device 18. A control window 14 provides the operator with "point and click" controls for display of the three-dimensional object. These controls allow the operator to rotate the object in any direction and to zoom in or out. A texture window 16 displays the two-dimensional surface texture that is to be applied to the object in window 12.

Figure 2:
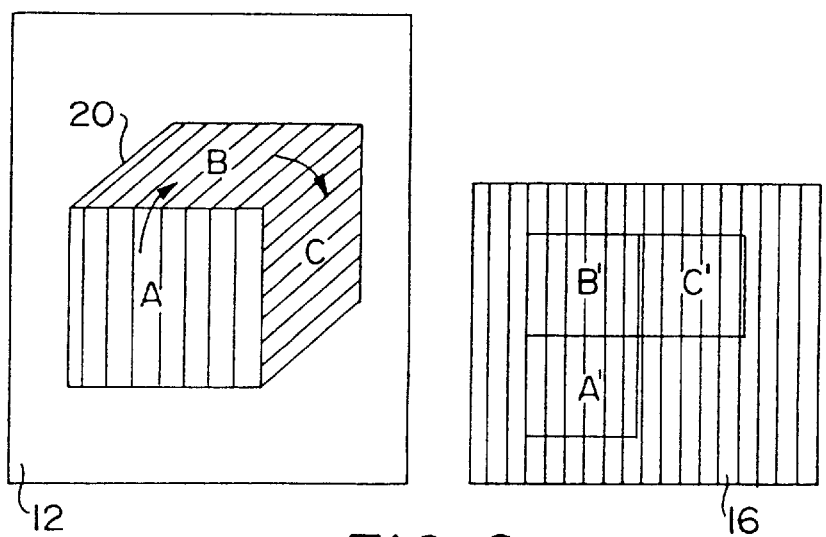
FIG. 2 illustrates a first alternative texture mapping of a simple three-dimensional object.

The basic operation of the invention can be understood with reference to FIG. 2. A three-dimensional object 20, shown here as a simple cube, is displayed in object window 12. The surface texture to be applied to object 20, in this case a simple stripe pattern, is displayed in texture window 16. The operator begins by designating one of the surface polygons of object 20, for example polygon A, by positioning the cursor on the polygon. The operator must then decide how to proceed with wrapping the object with the surface texture. Since the texture is treated as a relatively inelastic material, such as a fabric, this entails a decision as to where seams will be placed on the object. As illustrated in FIG. 2, the operator first clicks the cursor on polygon A and then drags the cursor to polygon B. This automatically applies the texture to polygons A and B so that the pattern appears on each surface with proper perspective and so that there is pattern continuity across the boundary between polygons A and B. The operator then continues to drag the texture onto polygon C such that there is pattern continuity across the border between polygons B and C. Again, the pattern perspective is automatically adjusted to appear correctly on the surface of polygon C. As a result of the sequence of the operator's actions, there is a seam (i.e., a pattern discontinuity) at the border between polygons A and C.

Referring now to the texture window 16 in FIG. 2, as each of the polygons is designated by the operator, it is projected onto the two-dimensional texture image. Thus, when the operator designates polygon A in object window 12, projection A' is displayed in texture window 16. Likewise, projections B' and C' are displayed in texture window 16 as the operator designates polygons B and C, respectively. The end result is a "flattening" of object 20 over the texture image. As will be explained below, the operator may adjust the texture mapping by manipulating the polygon projections within the texture window.

Figure 3:
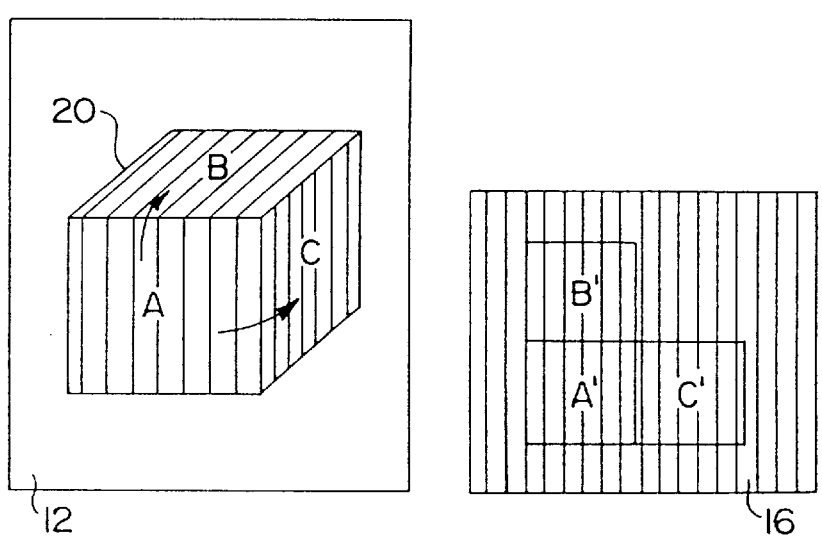
FIG. 3 illustrates a second alternative texture mapping of a simple three-dimensional object.

Referring now to FIG. 3, an alternative wrapping of texture onto object 20 is illustrated. In this example, the operator again initially designates polygon A and then drags the texture onto polygon B. However, instead of continuing to polygon C, the operator clicks on polygon a again and drags the texture onto polygon C so that there is pattern continuity across the border between polygons A and C. This results in a seam along the border between polygons B and C. The different result is also portrayed in texture window 16 where polygon C' is now shown adjacent to polygon A' rather than B'.

Figure 4:
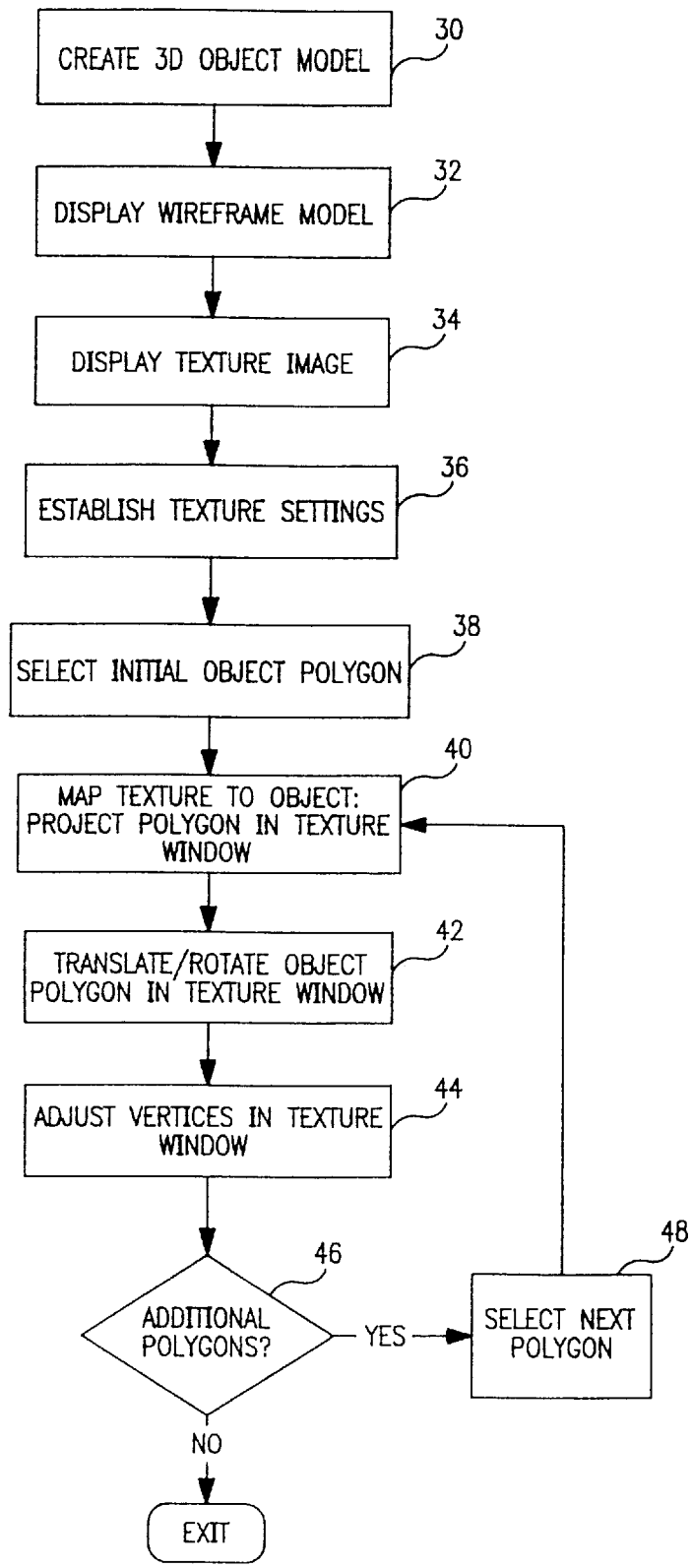
FIG. 4 is a functional flow diagram of the process steps of the present invention.

The process of texture mapping in accordance with the present invention is more fully explained with reference to FIG. 4. Beginning at step 30, a three-dimensional object is modeled using any of a number of conventional modeling applications. The object is defined as a set of polygons and polygon groups in a three-dimensional (x,y,z) coordinate system. The object data is stored as an image file such as a .OBJ file. Creation of the three-dimensional object model will normally be done "off line" from the texture mapping process of the present invention.

Once the desired object model is created or is imported, it is displayed as a wire frame in the operator's object window. Using the operator controls, the object can be viewed from any location in three-dimensional space.

Proceeding to step 34, the desired texture image, which will typically be imported as a .TIF, .BMP or .WTX file, is displayed in the operator's texture window. The texture image has a defined "center point", which can be assigned and moved by the operator. The center point is a reference for texture pattern placement on the object. The operator can also establish texture flow settings. These operator defined settings, along with the texture image, repeat characteristics and physical dimensions of the texture are all saved as a .WTX formatted file. The information contained in such a file permits a single set of u,v mapping values in real world dimensions to be used with any texture image saved as a .WTX file. Thus, once the operator has completed a texture mapping onto an object, any other texture can be automatically applied to that object.

At step 38, the operator designates an initial polygon on the surface of the three-dimensional object. The polygon is automatically filled with a default mapping of the texture based on the defined center point of the texture. At the same time, the designated polygon is "flattened" and is displayed as a two-dimensional projection on the texture image and the texture window. The polygon projection can be translated and/or rotated in the texture window to modify the default u,v mapping. Changes to the u,v mapping values are reflected in the three-dimensional rendering of the object in the object window. Individual vertices of the projected polygon in the texture window can be translated by the operator to introduce distortion in order to simulate the effect of fabric stretch. Again, changes made in this manner in the texture window are reflected in the three-dimensional rendering of the object.

If additional polygons are to be filled with texture, the operator selects the next polygon by dragging from a previously textured adjacent polygon or by simply selecting a new polygon. In the former case, clicking and dragging from a filled polygon to an adjacent empty polygon flows the texture in a continuous fashion across the border between the two polygons. In the latter case of simply selecting a new polygon, the default u,v mapping is applied to the new polygon. Steps 40, 42 and 44 are repeated for each newly selected polygon until surface texture has been applied to the entire object or to the desired portions of the object. If less than the entire object is covered with a particular texture, the set of polygons thus covered can be associated to form a "part". Parts of an object thus defined have the characteristic of sharing the same texture in any future renderings of the object.

As described above, when the operator first designates a polygon on the surface of the three-dimensional object, default u,v values are calculated. The following describes the manner in which such values are calculated. A polygon on the surface of the three-dimensional object is defined by the coordinates of its vertices in x,y,z space. It is presumed that all polygons defining an object are either triangles or quadrilaterals. The polygon is "flattened" to u,v space by projecting it onto a two-dimensional plane which intersects all of the vertices of the polygon. The flattening process involves three steps: First, one of the vertices is presumed to lie at the origin of two-dimensional x,y space and an adjacent vertex is presumed to be located on the x-axis; Second, the remaining vertex or vertices are transformed about the origin to be coincident with the two-dimensional x,y plane; Third, all vertices are translated using the u,v location of the defined texture center point as a delta value.

Figure 5:
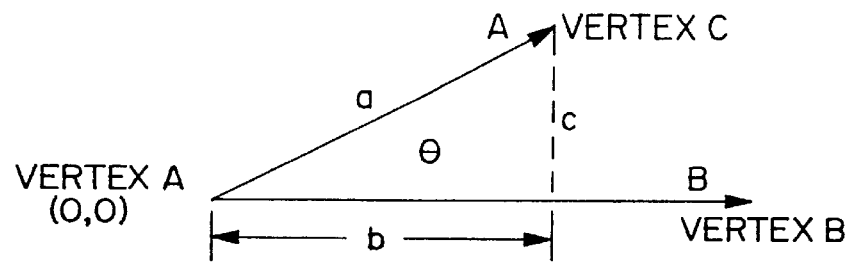
FIG. 5 illustrates calculation of default u,v values for an object polygon.

Referring to FIG. 5, vertex A is presumed to have x,y coordinates O,O. Vector a is defined as the polygon side between vertex A and vertex C. Vector B is defined as the polygon side between vertex A and vertex B. Length a is the length of vector A. Lengths b and c correspond to the x and y coordinates of vertex B, respectively. From FIG. 5, it can be seen that:

$$\cos\theta = A \cdot B/|A||B| \quad (1)$$

Therefore:

$$\cos\theta^* |A| = A \cdot B/|B| \quad (2)$$

since $\cos\theta = b/a$, and since $a = |A|$, it follows that:

$$\cos\theta^* = b/|A| \quad (3)$$

and $$\cos\theta^* |A| = b \quad (4)$$

substituting the right-hand side of equation (2) for $\cos\theta^* |A|$, we have the solution for b:

$$b = A \cdot B/|B| \quad (5)$$

Thus, length b, the x coordinate of vertex C, is equal to the dot product of vectors A and B divided by the vector length of B. Now, transforming equation 1, we have:

$$\theta = \operatorname{acos}(A \cdot B/|A||B|) \quad (6)$$

since $\sin\theta = c/a$, it follows that:

$$c = \sin\theta^* a \quad (7)$$

The location of vertex C in the two-dimensional x,y plane is therefore defined by the values of b and c. In the case of a quadrilateral, the same process is used to calculate the coordinates of the fourth vertex D.

Having thus computed the default u,v values of the polygon vertices, these may be translated and/or rotated in the u,v plane as previously described. When the operator then designates an adjacent polygon to which texture is flowed from the first, the u,v values for the second polygon are calculated as follows.

Figure 6:
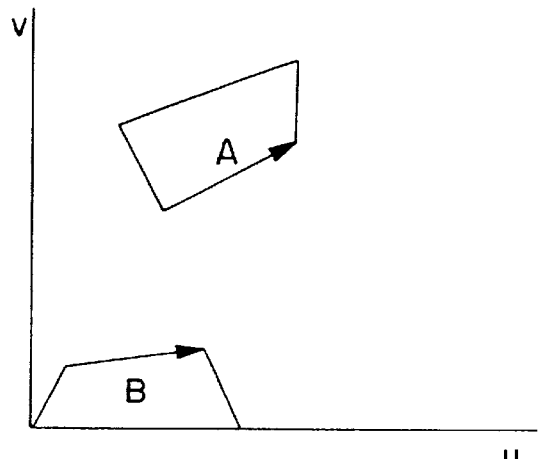
FIGS. 6–8 illustrate u,v mapping to achieve texture flow across a border between adjacent object polygons.

As illustrated in FIG. 6, polygon A has been rotated and translated in the u,v plane and default u,v values for the second polygon B have been calculated in the same manner as previously described. The vertices representing the common edge between the first and second polygons are then determined based on the known x,y,z coordinates of the vertices. Here, vector A of polygon A and vector B of polygon B are determined to define the common edge between the polygons.

Figure 7:
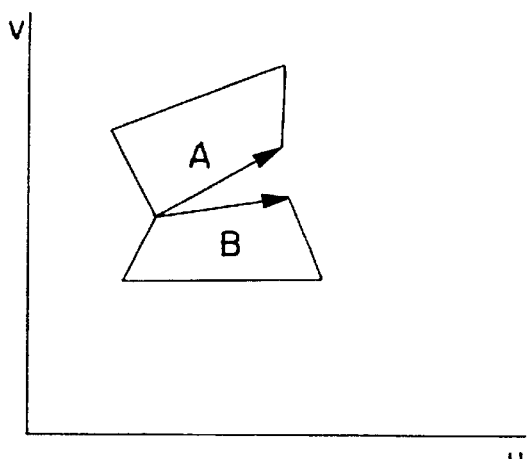
Figure 8:
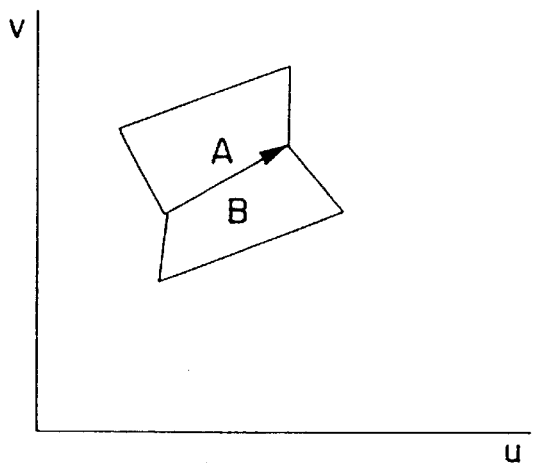

As illustrated in FIG. 7, polygon B is translated so that the origin of vector B coincides with the origin of vector A. Rotational values are calculated based on the definition of θ in equation (6) above. Polygon B is rotated as shown in FIG. 8 so that vectors A and B are coincident.

Having calculated a u,v mapping for each vertex of a polygon, interior pixel u,v values are mapped to two-dimensional screen space using any conventional interpolation scheme. One particularly suitable scheme is rational linear interpolation as described in *Interpolation for Polygon Texture Mapping and Shading* by Paul S. Heckbert and Henry P. Moreton. As observed by the authors, the homogenous texture coordinates suitable for linear interpolation in screen space can be computed simply by dividing the texture coordinates by the pixel spacing w, linearly interpolating the normalized coordinates (u/w,v/w), and multiplying the interpolated normalized coordinates by w at each pixel to recover the texture coordinates. This process maps texture to the polygon interior with correct perspective.

A problem in achieving photorealism in computer graphics is the computational overhead of replicating realistic lighting and shading models, especially at very fine levels of detail. The system of the present invention extends conventional texture mapping techniques to achieve high quality detail in the rendered image without significantly increasing the computational time required for rendering. This is accomplished by painting certain surface details directly onto the three-dimensional object. Such surface detail approximates local surface lighting effects which would result from bumps, folds, waves and other disturbances in the flow of the surface texture. Such effects are independent of the mapped texture and are difficult to represent directly in the three-dimensional model of the object using conventional modeling techniques.

Conventional "bump mapping" techniques adjust the gray scale surface values of a rendered object to create an illusion of distortion normal to the rendered surface. The present invention employs a technique that modulates the lighting values of each rendered pixel.

In the present invention, an object texture mode of operation provides the operator with a palette of tools, including variously shaped brushes, pencils, stamps and others. The operator manipulates these tools on the surface of the three-dimensional object in the object window to paint, shift, scale and shear surface textures directly on the rendered three-dimensional object. Use of the tools assigns a pixel-by-pixel multiplier that modulates the lighting intensity at the surface of the object, thereby simulating highlights and shadowing of surface detail features. The multiplier is normalized so that the unmodulated lighting intensity can be either dampened or intensified. The painted-on features become a part of the object model and are included in the .OBJ file. Such features will therefore be represented on the rendered object regardless of the texture that is applied. The features applied with the surface detail tools are mapped to the texture window where they can be further edited in the two-dimensional space of the surface polygon projections.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of applying surface detail to a graphic representation of a three-dimensional object, wherein the graphic representation comprises a plurality of contiguous polygonal surfaces, comprising the steps of:

(a) displaying the graphic representation of the three-dimensional object in a first display window;

(b) displaying a surface detail pattern in a second display window which is displayed simultaneously with the first display window;

(c) designating a first polygonal surface on the graphic representation of the three-dimensional object;

(d) applying the surface detail pattern to the first polygonal surface;

(e) designating a second polygonal surface having a first common boundary with the first polygonal surface; and (f) applying the surface detail pattern to the second polygonal surface such that there is pattern continuity across the first common boundary.

2. The method of claim 1 further comprising the step of displaying a projection of the first polygonal surface on the surface detail pattern.

3. The method of claim 2 further comprising the step of repositioning the projection of the first polygonal surface on the surface detail pattern to control at least one of scale, direction and placement of the surface detail pattern.

4. The method of claim 3 wherein the step of repositioning comprises moving a vertex to distort the projection of the first polygonal surface.

5. The method of claim 1 wherein the step of applying the surface detail pattern to the first polygonal surface comprises calculating two-dimensional coordinates of each vertex of the first polygonal surface on a plane intersecting all of the vertices of the first polygonal surface.

6. The method of claim 5 further comprising the step of translating the two-dimensional coordinates of each vertex by a predetermined delta value.

7. The method of claim 6 further comprising the step of defining a pattern center point on the surface detail pattern to establish said predetermined delta value.

8. The method of claim 1 further comprising the steps of:
   (g) designating a third polygonal surface having a second common boundary with the first polygonal surface and a third common boundary with the second polygonal surface;
   (h) applying the surface detail pattern to the third polygonal surface such that there is pattern continuity across the second common boundary and pattern discontinuity across the third common boundary.

9. The method of claim 1 further comprising the steps of:
   (g) designating a third polygonal surface having a second common boundary with the first polygonal surface and a third common boundary with the second polygonal surface;
   (h) applying the surface detail pattern to the third polygonal surface such that there is pattern continuity across the third common boundary and pattern discontinuity across the second common boundary.

10. The method of claim 1 wherein the step of designating the second polygonal surface comprises clicking a cursor on the first polygonal surface and dragging the cursor to the second polygonal surface.

11. The method of claim 1 wherein the graphic representation of the three-dimensional object is a perspective view.

12. The method of claim 11 wherein the surface detail applied to the first and second polygonal surfaces is distorted to have a perspective appearance corresponding to apparent perspectives of the first and second polygonal surfaces, respectively.

13. A system for applying surface detail to a graphic representation of a three-dimensional object, wherein the graphic representation comprises a plurality of contiguous polygonal surfaces, said system comprising:
   (a) means for displaying the graphic representation of the three-dimensional object in a first display window;
   (b) means for displaying a surface detail pattern in a second display window which is displayed simultaneously with the first display window;
   (c) means for designating a first polygonal surface on the graphic representation of the three-dimensional object;
   (d) means for applying the surface detail pattern to the first polygonal surface;
   (e) means for designating a second polygonal surface having a common boundary with the first polygonal surface; and
   (f) means for applying the surface detail pattern to the second polygonal surface such that there is pattern continuity across the common boundary.

14. The system of claim 13 wherein the graphic representation of the three-dimensional object is a perspective view.

15. The system of claim 14 wherein the surface detail applied to the first and second polygonal surfaces is distorted to have a perspective appearance corresponding to apparent perspectives of the first and second polygonal surfaces, respectively.

16. A method of applying surface detail to a graphic representation of a three-dimensional object comprising the steps of:
   (a) displaying the graphic representation of the three-dimensional object;
   (b) applying painted details on a surface of the graphic representation of the three-dimensional object;
   (c) modulating light values on the surface of the graphic representation of the three-dimensional object in accordance with the painted details.

17. The method of claim 16 further comprising the step of saving in a computer file the painted details as three-dimensional data together with three-dimensional data defining the three-dimensional object.

18. The method of claim 16 wherein the light values are gray scale values.

19. The method of claim 16 wherein the light values are color values.

* * * * *